April 23, 1963  C. P. SMITH ETAL  3,086,899
CONSTRUCTIONAL LAMINA
Filed May 4, 1956
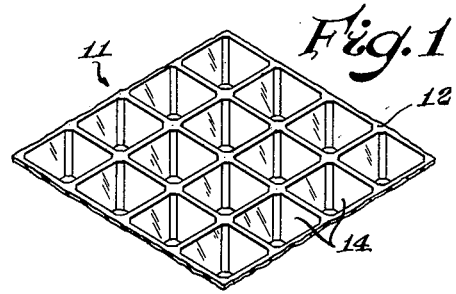
Fig. 1
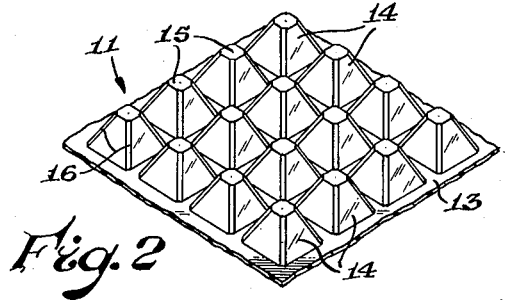
Fig. 2
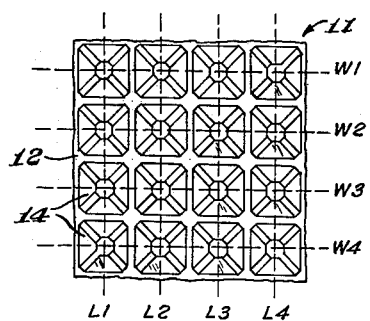
Fig. 3
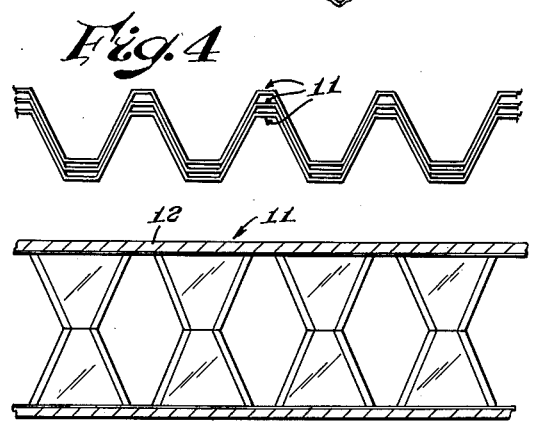
Fig. 4
Fig. 5
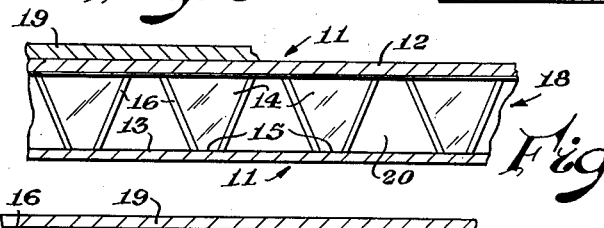
Fig. 6
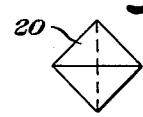
Fig. 7
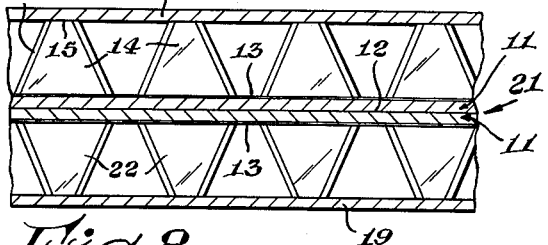
Fig. 8
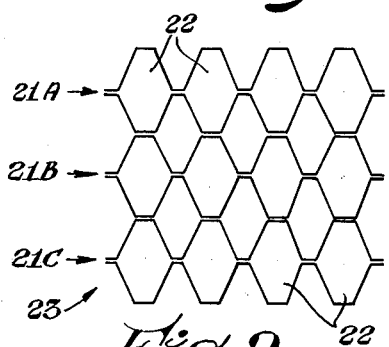
Fig. 9
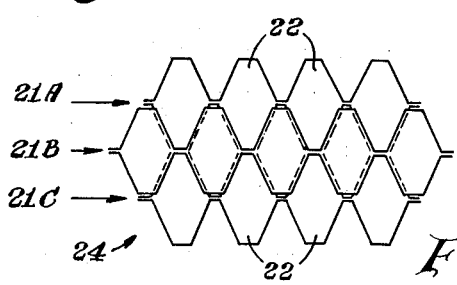
Fig. 10
INVENTORS.
Cornelius P. Smith
Robert B. Ingraham
BY
Griswold & Burdick
ATTORNEYS

United States Patent Office 3,086,899
Patented Apr. 23, 1963

3,086,899
CONSTRUCTIONAL LAMINA
Cornelius P. Smith and Robert B. Ingraham, Midland, Mich., assignors to The Dow Chemical Company, Midland, Mich., a corporation of Delaware
Filed May 4, 1956, Ser. No. 582,700
7 Claims. (Cl. 154—45.9)

This invention has reference to, and has as among its principal objectives, the provision of peculiar shaped articles having utility as lamina for the construction of composite, laminar, cellular wall structures and like partitions. It also relates to the structures assembled from such laminae and to a method for manufacturing such structures with such laminae.

A shaped article that constitutes a lamina for employment in a composite structure in accordance with the present invention is comprised of an indented sheet having a plurality of identical, open, cup-like depressions projecting from the back and away from the face of the sheet, said depressions being disposed relative to one another in square arrangement and being patterned in alignment in said sheet in a plurality of regularly spaced, parallel rows that extend normally in both directions of said sheet. Advantageously, the depressions on the sheet may be adapted by their spacing and configuration to extend between and interdigitate with depressions on a like sheet when the sheet is positioned in a back-to-back manner with a like indented sheet. A composite, cellular wall structure or the like in accordance with the present invention may advantageously consist of and be assembled from a pair of the laminae in adjacent interfacial or back-to-back contact, or advantageously, of and from an adjacent plurality of contacting pairs.

Further features and advantages of the invention will be more apparent in the following description and specification, taken in connection with the accompanying drawing, wherein:

FIGURES 1 and 2 are perspective fragmentary illustrations showing uppermost the face side and the other side, respectively, of one embodiment of a lamina for employment in a composite structure in accordance with the present invention;

FIGURE 3 is a fragmentary plan view of the lamina depicted in FIGURES 1 and 2 which also illustrates the geometrical pattern of the depressions in the sheet;

FIGURE 4 schematically portrays several laminae in a nested arrangement;

FIGURES 5 and 6, in fragmentary side elevation, depicts a pair of laminae assembled in various back-to-back arrangements to provide cellular wall structures;

FIGURE 7 illustrates a type of cell configuration which may be provided between laminae pairs assembled in interdigitating back-to-back arrangement;

FIGURE 8, in fragmentary side elevation, depicts a pair of laminae assembled in interfacial contact to provide a cellular wall structure; and FIGURES 9 and 10 schematically represent various wall or partition structures comprising adjacent pluralities of assembled pairs of the laminae.

There is perspectively shown in FIGURES 1 and 2 of the drawing a sheet lamina, indicated generally by the reference numeral 11, which is adapted for utilization in composite structures in accordance with the present invention. In FIGURE 1, the lamina 11 is shown with its upper or face side 12 uppermost. In FIGURE 2, the lamina 11 is inverted to display in an uppermost position its bottom or outer side 13 from which are projecting away from the face of the sheet a plurality of identically formed cup-like depressions 14. The depressions 14 are disposed relative to one another in square arrangement and, as is also demonstrated in FIGURE 3, are patterned in alignment in a lamina so as to describe a plurality of regularly spaced, parallel rows that extend normally in both directions of the lamina. Thus, as is illustrated by the dotted lines W1, W2, W3, W4, L1, L2, L3 and L4 (drawn in FIGURE 3 so as to pass through the centers of the regularly spaced and patterned, aligned depressions 14), all of the rows of depressions extending in one direction of the lamina are regularly spaced parallel and are at right angles to all of the likewise regularly spaced parallel rows of depressions extending in the other direction of the lamina.

The depressions 14 may be formed to have any desired shape although it is usually preferable for them to be provided with a regular and symmetrical geometric configuration. It is also beneficial to form them with a tapering shape to facilitate nesting unassembled laminae one within the other, as is schematically depicted in FIGURE 4. This permits easier handling and storage of the laminae prior to their assembly into cellular wall structures. While they may also be cylindrical or hemispherical, it is advantageous for the depressions 14 to have a generally conical configuration (not shown), or, more advantageously, as is illustrated in the several views of the drawing, a generally pyramidal configuration. It usually is desirable for depressions that are in pyramidal (or in conical) form to be truncated to provide them with a flat apex 15. In addition, it may also be desirable, especially when certain types of multiple laminae pair wall structures are to be assembled, for the pyramidal depressions to be so spaced, as depicted in the first three figures of the drawing, to permit them to extend between one another in interdigitated disposition when like laminae are positioned in a back-to-back relationship. In such cases it may also be desirable for pyramidal depressions to have beveled vertical edges to permit their interlocking when disposed in interdigitating relationship.

One basic or simple form of structure which may be assembled from a pair of the laminae is shown in FIGURE 5 of the drawing and indicated generally by the reference numeral 17. In this arrangement, which ordinarily can be utilized with a given type of lamina to obtain a minimum density structure having relatively greater flexibility, the laminae 11 are positioned in back-to-back relationship with the depressions 14 in apical contact and being apicifixed to one another. Another basic form of structure, indicated generally by the reference numeral 18, is shown in FIGURE 6 with the individual spaced depressions 14 from the back-to-back laminae 11 interdigitated. Such an assembly is usually characterized in having maximum density and rigidity, especially when truncated pyramidal depressions with interlocking beveled edges are available on the laminae. When the depressions 14 on the laminae 11 are suitably spaced and have a truncated pyramidal configuration and a back-to-back interdigitating assembly (as in the basic structure 18 of FIGURE 6) is provided, there are formed between the laminae and the interdigitated depressions a discontinuous plurality of substantially tetrahedral cells 20 having the general configuration schematically illustrated in FIGURE 7. As is also shown in FIGURE 6, a facing or cover strip 19 may be placed over the exposed lamina to provide a smooth surface and, as illustrated, to enclose the exposed open depressions 14 in the lamina.

A third variety of basic constructional unit, indicated generally by the reference numeral 21, is shown in FIGURE 8 assembled from a single pair of the laminae 11 that are joined in interfacial contact on their face sides 12. This manner of simple assembly also has a low bulk density and, depending on the material in the laminae, may provide a relatively more flexible structure. Better results may generally be secured when the laminae 11 are thus joined so that the cup-like depressions in each are matched to face one another in abutting, totally communicating relationship. This provides a multiplicity of closed, discontinuous, substantially octahedral cells 22 in the composite structure. As shown in FIGURE 8, a face plate 19 covers each side of the structure 22. However, as is apparent, the employment of a cover on either or both sides of any of the structures of the invention is an optional matter.

Wall structures or partitions that are comprised of an adjacent plurality of any of the basic, single laminae pair units 17, 18 or 22 generally have greater strength or rigidity, or both, and superior insulating characteristics. Such structures may be assembled in various ways. For example, as represented in FIGURE 9, a multiple laminae pair wall structure 23 may be formed from several flatly adjacent basic units 21A, 21B and 21C, each similar to the simple structure 21 of FIGURE 8, that are joined on the outer sides of the sheets with the contiguous matching and corresponding cell forming depressions that are projecting from the individual units being apicifixed to one another. Or, as is represented in FIGURE 10, the individual multiple octahedral cell units 21A, 21B and 21C in the wall structure 24 may be assembled with the projecting depressions positioned in an interdigitating relationship to joint flatly adjacent units along the contacting pyramidal sides. Thus, besides the octahedral cells 22 that are present, a plurality of tetrahedral cells 20 in the structure 24 are provided between the adjacent back sides of the lamina 11. As is apparent, although not illustrated in the drawings, the outer surface of either of the plural laminae pair structures 23 or 24 in FIGURES 9 and 10, respectively, may be made with the open depressions 14 exposed, as in the simple structures 17 and 18 of FIGURES 5 and 6, respectively. They also may be provided with outer covers (not shown) on one or both sides, as may be desired.

The constructional lamina of the present invention may have any desired or practical dimensions. Likewise, the spacing and size of the cell-forming depressions may be designed to meet whatever requirements that may be involved for the finally assembled structure. The laminae may be made from any suitable material of construction and may be fabricated in any desired or appropriate manner. They may be prepared from either rigid or relatively flexible materials to meet the needs of the structures that are to be assembled therefrom. Thus various plastics, rubbery materials, metals, paper and pulp, plaster, concrete and the like may be employed for the laminae which may be formed therefrom by molding, casting, stamping or other appropriate forming techniques for the particular material of construction that is involved. The laminae may be joined into wall structures or other partitions such as for decking, barriers and the like by any suitable means including cements, adhesives, welding, mechanical fasteners and the like. In the case of thermoplastic materials, they frequently may be permanently assembled with great benefit by utilization of heat sealing techniques. Advantageously, the lamina may be comprised of thermoplastic resinous materials such as polystyrene and the like that may be thermally or adhesively joined to form strong, rigid, vapor-proof structures that have a controlled and exceptionally uniform bulk density and weight distribution.

It is to be fully understood that the present invention is to be construed and interpreted not by the foregoing didactic description and specification but in the light of what is set forth and defined in the appended claims.

What is claimed is:

1. A structure comprising, in assembled, flatly adjacent contact, a like pair of indented sheets, each sheet having a plurality of identical, open, cup-like depressions projecting from the back and away from the face of the sheet, said depressions being disposed relative to one another in square arrangement and being patterned in matching alignment in each of said sheets in a plurality of regularly spaced, parallel rows that extend normally in both directions in each of said sheets, the sheets in said structure being interfacially assembled with the matching depressions in each sheet facing one another in abutting, totally communicating relationship to provide a multiplicity of closed, adjacent, discontinuous cells in the structure, wherein the pair of sheets is assembled in a flatly adjacent, back-to-back manner with contiguous matching depressions extending between one another in an interdigitating relationship.

2. A shaped article adapted to be assembled into a structure in accordance with the structure set forth in claim 1, said shaped article comprising an indented sheet having a plurality of identical, open, cup-like, truncated pyramidal depressions projecting from the back and away from the face of the sheet, said depressions being disposed and spaced relative to one another in square arrangement and being patterned in alignment in said sheet in a plurality of regularly spaced, parallel rows that extend normally in both directions of said sheet, the depressions on the sheet being adapted to extend between and interdigitate with depressions on a like sheet and to provide a plurality of substantially tetrahedral, adjacent discontinuous cells between the sheets when the sheet is positioned in a back-to-back relationship with a like indented sheet.

3. A shaped article in accordance with the article set forth in claim 2, wherein said truncated pyramidal depressions have beveled, interlocking vertical edges.

4. In assembled combination, a flatly adjacent plurality of like structures, each structure comprising, in assembled interfacial contact, at least a like pair of indented sheets, each sheet having a plurality of identical, open, cup-like depressions projecting away from the face of the sheet, said depressions being disposed relative to one another in square arrangement and being patterned in matching alignment in each of said sheets in a plurality of regularly spaced, parallel rows that extend normally in both directions in each of said sheets, wherein the adjacent structures are assembled with contiguous projecting depressions positioned in interdigitating relationship to one another.

5. In assembled combination, a flatly adjacent plurality of like structures, each structure comprising, in assembled interfacial contact, at least a like pair of indented sheets, each sheet having a plurality of identical, open, cup-like depressions projecting away from the face of the sheet, said depressions being disposed relative to one another in square arrangement and being patterned in matching alignment in each of said sheets in a plurality of regularly spaced, parallel rows that extend normally in both directions in each of said sheets, wherein the depressions in each of the sheets in each of the structures have a pyramidal configuration and the adjacent structures are assembled with contiguous projecting depressions positioned in interdigitating relationship to one another.

6. In assembled combination, a flatly adjacent plurality of like structures, each structure comprising, in assembled interfacial contact, at least a like pair of indented sheets, each sheet having a plurality of identical, open, cup-like depressions projecting away from the face of the sheet, said depressions being disposed relative to one another in square arrangement and being patterned in matching alignment in each of said sheets in a plurality of regularly spaced, parallel rows that extend normally in both directions in each of said sheets wherein the depressions in each of the sheets in each of the structures have a truncated pyramidal configuration and the adjacent structures are assembled with contiguous projecting depressions positioned in interdigitating relationship to one another to provide a plurality of discontinuous, adjacent, substantially tetrahedral cells between the backs of said sheets.

7. In a combination in accordance with that set forth in claim 6, each of the truncated pyramidal depressions having interlocking, beveled vertical edges.

References Cited in the file of this patent

UNITED STATES PATENTS

| | | |
|---|---|---|
| 1,958,050 | Koppelman | May 8, 1934 |
| 2,179,057 | Schuetz | Nov. 7, 1939 |
| 2,481,046 | Scurlock | Sept. 6, 1949 |
| 2,518,164 | Meyer | Aug. 8, 1950 |
| 2,622,051 | Hermanson et al. | Dec. 16, 1952 |
| 2,689,988 | French | Sept. 28, 1954 |
| 2,856,323 | Gordon | Oct. 14, 1958 |